Aug. 25, 1970  L. M. MOTT-SMITH  3,525,416
AIR OPERATED UNDERWATER SEISMIC SOURCE
Filed March 10, 1969  2 Sheets-Sheet 1
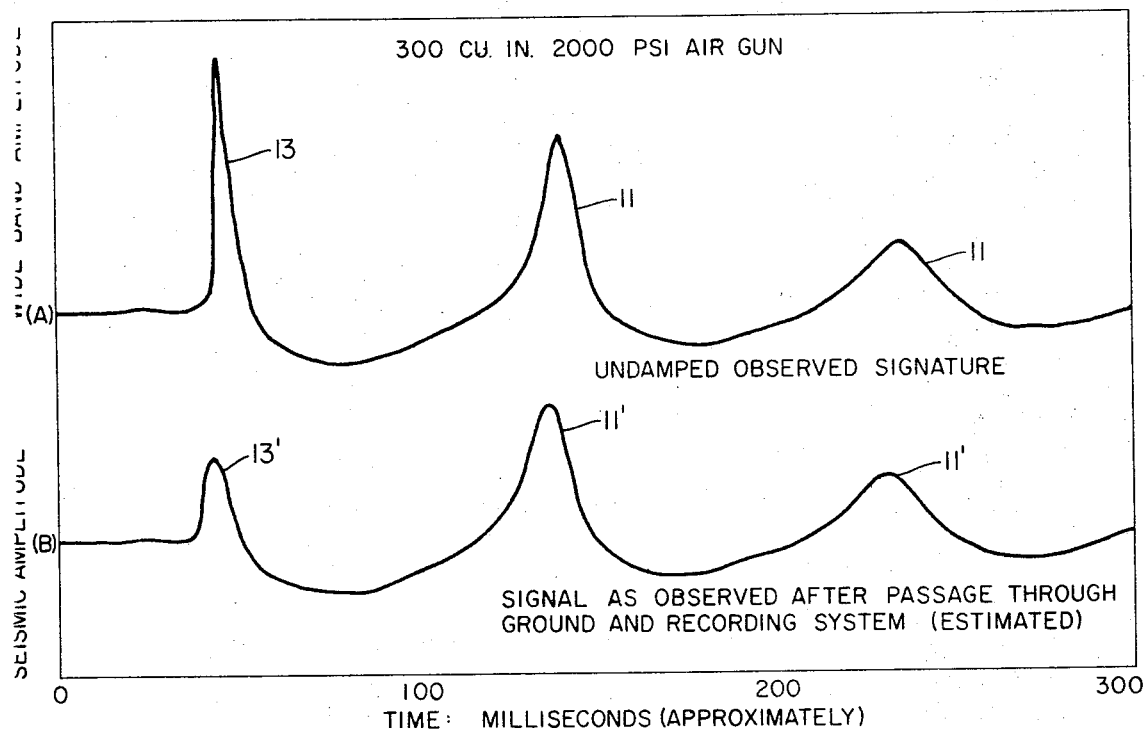
FIG_1
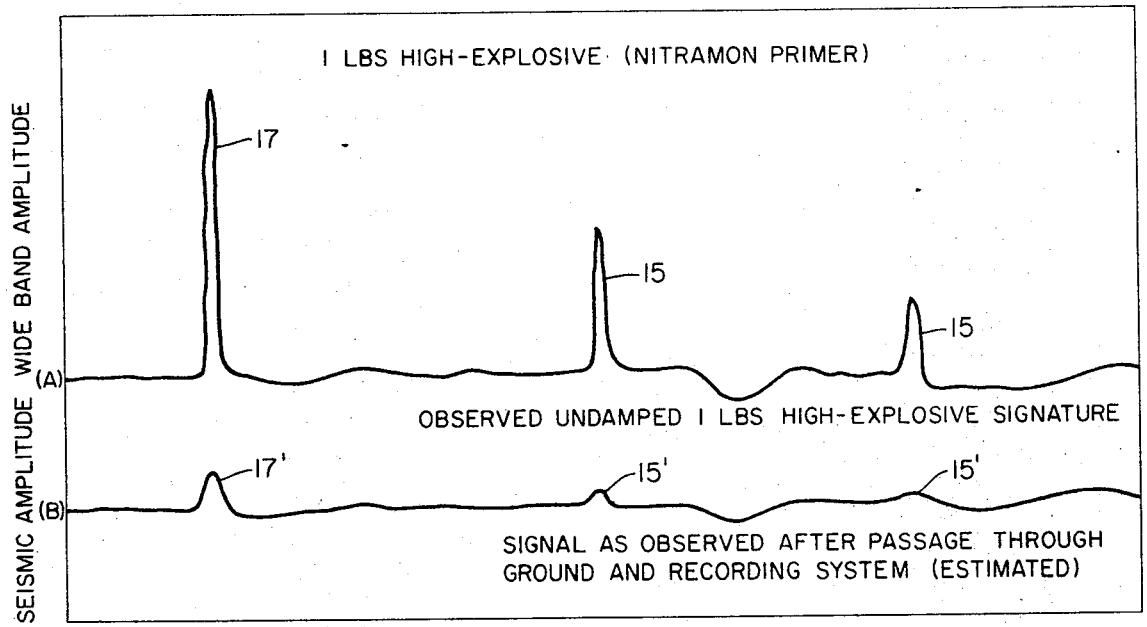
FIG_2
INVENTOR.
LEWIS MORTON MOTT-SMITH
BY *Robert H. Clay*
ATTORNEY Aug. 25, 1970 L. M. MOTT-SMITH 3,525,416
AIR OPERATED UNDERWATER SEISMIC SOURCE
Filed March 10, 1969 2 Sheets-Sheet 2
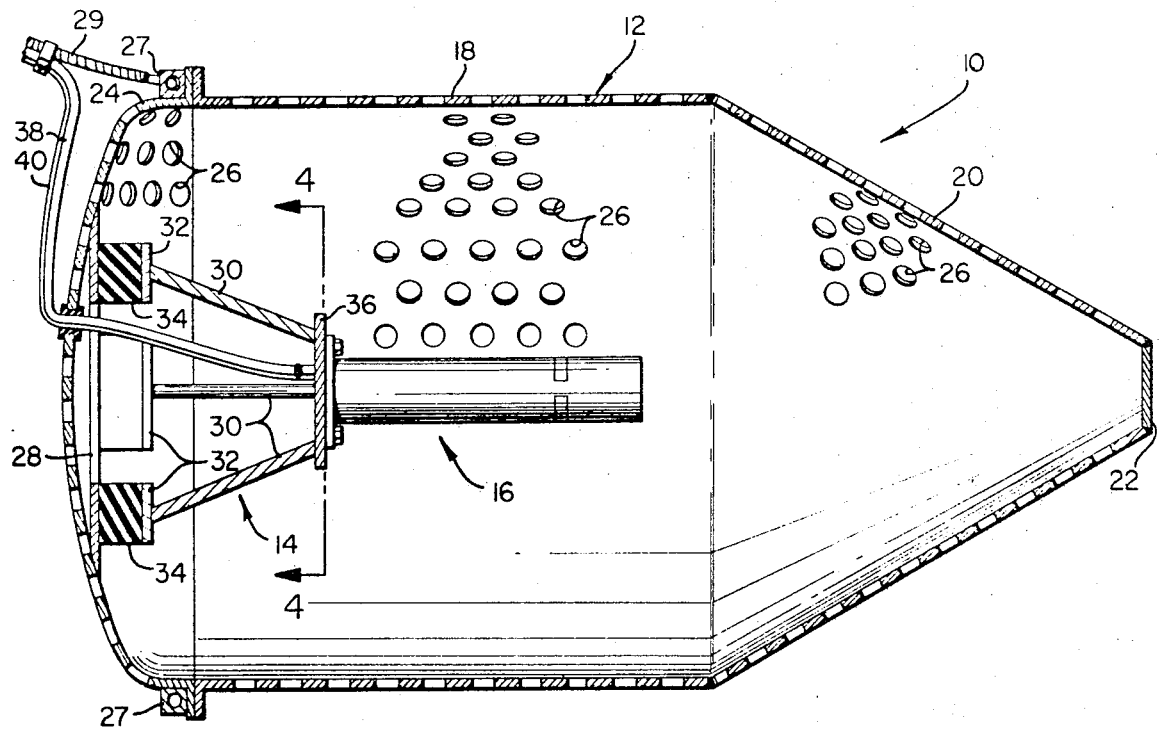
FIG_3
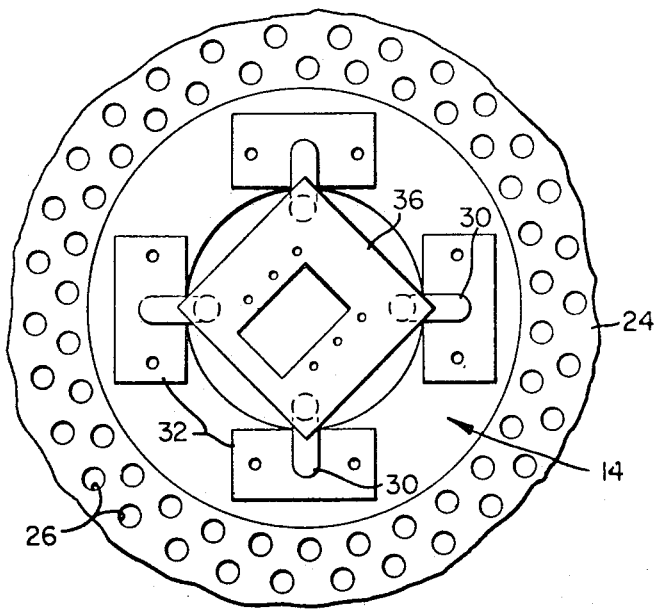
FIG_4
INVENTOR.
LEWIS MORTON MOTT-SMITH
BY Robert S. Clay
ATTORNEY

United States Patent Office 3,525,416
Patented Aug. 25, 1970

3,525,416
AIR OPERATED UNDERWATER SEISMIC SOURCE
Lewis Morton Mott-Smith, Houston, Tex., assignor to Mandrel Industries, Inc., Houston, Tex., a corporation of Michigan
Continuation-in-part of application Ser. No. 668,582, Sept. 18, 1967. This application Mar. 10, 1969, Ser. No. 806,348
Int. Cl. G01v 1/04, 1/38
U.S. Cl. 181—.5                                    3 Claims

ABSTRACT OF THE DISCLOSURE

A seismic source, utilizing a high-pressure fast-acting air valve, capable of imparting a burst of air and thus a seismic signal to a fluid medium, including a perforated shell surrounding the air valve, which shell has selected dimensions and degree of perforations which are determined by the particular characteristics of a seismic signal generated by the air valve. The shell is thus particularly designed for use with an air valve source, wherein secondary pulses peculiar to an air valve source are damped out by the shell. The degree of restriction generally determines the range of frequencies of the seismic signal which is produced. The valve is shock-mounted within the shell to protect the perforated shell from the force reaction produced by the air valve.

CROSS-REFERENCE TO RELATED APPLICATION

This is a continuation-in-part application of application Ser. No. 668,582, filed Sept. 18, 1967, now abandoned.

BACKGROUND OF THE INVENTION

Various apparatus are available for generating seismic signals in a fluid medium, such as is done in underwater seismic exploration, wherein such apparatus utilize various theories of operation. Typical of the marine seismic sources are those utilizing dynamite, combustible gases or compressed air to generate an explosion or expanding bubble within the water. If a gas bubble is formed underwater by the explosion of an explosive charge or the sudden release of a quantity of high pressure gas, the elasticity of the gas coupled to the inertial mass of the surrounding water forms an oscillatory system. The bubble will grow and shrink at its natural period until energy dissipation because of the viscosity of the water, and the radiated acoustic energy gradually brings it to its equilibrium volume as determined by the quantity of gas in the bubble and the ambient hydrostatic pressure of the water. These oscillations are undesirable, because at each pulsation an oscillating seismic signal is generated, whereas a single seismic pulse is desired.

As is known in the art, it is desirable to obtain a single distinct echo from each layer of formation, which is more readily accomplished by providing a single distinct seismic pulse. A series of uncontrolled seismic pulses would tend to generate an associated series of echos from each of the layers of the formation, where echos from layers due to secondary pulses would overlap and thus disguise the echos generated by the initial and desirable primary pulse.

The existing methods for suppressing bubble oscillation are, for the case of explosives, firing the charge near enough to the surface so that the bubble breaks the surface so that it is dissipated before secondary pulses can be generated, or surrounding the charge by a perforated enclosure to suppress the secondary oscillations. The first method is that used in conventional seismic marine operations using explosives. The second method is described in U.S. Pat. No. 2,877,859 to W. C. Knudsen, wherein the perforated enclosure is designed for use with explosives.

Likewise, when utilizing combustible gases or compressed air sources, secondary pulses are generated as when employing dynamite explosions, which also are detrimental to the process of underwater seismic exploration. Thus various means have been developed to prevent the generation of secondary pulses when using combustible gases or compressed air. Typical of such means is that shown for example, in U.S. Pat. No. 3,292,140 to F. A. Angona et al. which provides, in combination with a gas seismic source, a means including a conduit extending downwardly from the surface, for directing gas from the water surface into the bubble which is formed by the seismic source, e.g., the gas explosion, which reduces the contraction of the bubble to prevent the secondary pulses from forming.

However, both the above systems utilizing either dynamite or combustible gases have various inherent disadvantages. For example, dynamite is cumbersome to utilize, is expensive, is dangerous to handle and accordingly must be handled in accordance with various regulations and in general, causes a certain amount of destruction to sea life. Combustible gases on the other hand require an excessive amount of equipment necessary in handling the constituents being used, is expensive to use, and is likewise dangerous to handle.

SUMMARY OF THE INVENTION

The present invention provides an improved underwater seismic source utilizing a fast-acting air valve supported within a perforated shell of particular design and size commensurate with the relatively low energy output and the particular seismic pulse characteristics generated by an air valve. That is, the shell size is at least equal to the maximum diameter of the generated air bubble, and the area removed by the perforations is preferably equal to or less than 25% of the total shell surface. The shell is shaped to allow it to be readily towed underwater and the air valve is shock-mounted within the shell to permit use of a shell of reasonable weight yet strong enough to withstand the shock occurring when the air valve is actuated.

The present invention provides advantages over either the shielded dynamite explosive source, or the vented combustible gas type source, in that there is no need for special precautions in handling the operating medium and only compressed air apparatus is required to supply the air valve with compressed air. The invention further provides a generally desirable and controllable range of frequencies, while suppressing the formation of secondary pulses, to thus generate an optimum seismic signal pulse.

BRIEF DESCRIPTION OF THE DRAWING

FIGS. 1A–B and 2A–B are graphs depicting the "signatures," i.e., the typical pulse shapes or characteristics and the seismic signals, of an air valve source and a high explosive source, respectively.

FIG. 3 is a cross-sectional view of the air operated underwater seismic source of the invention.

FIG. 4 is a cross-sectional view taken along lines 4—4 of FIG. 3.

DESCRIPTION OF THE PREFERRED EMBODIMENT

In order to understand the method of suppressing bubble oscillation, the process of bubble expansion and contraction may be considered in somewhat more detail. Immediately after the detonation of an explosive charge, or the moment when a volume of high pressure air is released by an air valve, the bubble consists of a small volume of highly compressed gas. This gas exerts considerable force on the surrounding water, accelerating it radially outwardly, resulting in rapid increase of the volume of the bubble. If the moving water had no inertia, the bubble would grow until the internal gas pressure would decrease to a value equal to the external hydrostatic pressure and would not grow any larger. However, the effect of the momentum of the water once placed in motion by the introduction of compressed air is to cause the bubble to overshoot its equilibrium volume, and to grow to a considerably larger volume. That is, although the internal pressure decreases to a value less than that of the external hydrostatic pressure, bubble growth continues due to the momentum of the outwardly moving water until the excess external pressure arrests further expansion. The bubble then starts to contract and eventually returns nearly to its original small volume. These oscillations continue with gradually diminishing amplitude until the bubble comes to equilibrium or is broken up in some fashion. If no damping is provided, the frequency of the resulting signal generally varies with the size of the bubble formed, which in turn, depends upon the depth at which the bubble is formed, viz., the external hydrostatic pressure and the output value or capacity of the air valve.

The acoustic output generated by the bubble formed by for example high pressure air guns occurs principally near the times of minimum volume. Thus a strong seismic pulse (defined herein as the desired initial pulse) is generated by the initial expansion of the bubble from a small volume at the moment that air is introduced to the water, and additional, secondary pulses are generated at each subsequent return of the air bubble to a small volume. It is, therefore, the aim of suppression methods to prevent the bubble from executing the first and subsequent contractions, or if complete suppression is not possible, to reduce these contractions to the point where the seismic output therefrom becomes acceptably small relative to the output from the initial pulse.

The method by which a perforated enclosure suppresses bubble oscillation is based on the resistance to the flow of water caused by the enclosure. As the bubble expands and contracts, water must flow through the holes in the enclosure. Such flow requires a pressure differential across the orifices and this pressure is in such a direction as to retard the growth as well as the contraction of the bubble. When the bubble is small the flow velocity through the holes is small, and the retarding effect is small, and the effect on the amplitude of the initial seismic pulse is correspondingly small. As the bubble expands the flow velocity increases and the damping effect becomes appreciable. This effect can be made sufficiently large so that the first and subsequent contractions are much smaller than in absence of damping and the seismic output due to these contractions is correspondingly greatly reduced.

When studying marine seismic sources it is convenient to define two concepts of amplitude of the pulses generated by the source; viz., the "wide-band" amplitude and the "seismic" amplitude. The former is the true amplitude of the pulse as observed by a wide-band recording system, or as calculated theoretically. The latter is the amplitude that the pulses would have after they have been filtered by the effect of passage through the ground and by the recording system. It is this latter amplitude that is observed in normal seismic exploration and is therefore the more important characteristic of a source when attempting to design a device capable of secondary oscillation suppression.

When dealing with narrow pulses such as those generated by high-pressure air valve sources and especially by high explosives, there is always a considerable difference in magnitude between the two amplitudes. This behavoir can be understood by considering the situation in the frequency domain. The first pulse of a standard air valve source has a spectral width extending from 0 to 250 Hz. After passage through the ground and filtering by the recording amplifiers, the spectrum has been narrowed typically to the interval between 15 and 60 Hz. Accordingly a large part of the original signal has been removed, meaning loss of energy and corresponding reduction in amplitude.

It follows that in order to design effective damping devices for these sources, the foregoing type of analysis is essential.

As previously noted, and in accordance with the invention, the objective of the design is to suppress the secondary pulses, while reducing the seismic amplitude of the first pulse as little as possible. The invention method of doing this is to surround the source with a perforated shell of suitable size and a suitable number of perforations. It has been found that for an effective damping device the fraction of perforations, or ratio of perforation area to total area of the shell is markedly different for air valve sources than for high explosive sources. By way of explanation, referring to FIGS. 1 and 2, the essential difference between the air valve signature, FIG. 1A, and the high explosive signature, FIG. 2A, is that the secondary pulses 11 for the air valve source are wider than the first pulse 13, whereas for the high explosive source subsequent pulses 15 are nearly as narrow as the first pulse 17. The effect of this behavior on the seismic amplitude is shown in the associated seismic signal traces of FIGS. 1B and 2B. In the case of the air valve source the first pulse (13, 13′) is severely attenuated relative to the second and subsequent pulses (11, 11′) because its band width is about 250 Hz., much greater than the seismic pass band. The secondary pulses on the other hand, have band-widths almost equal to the seismic band and are, therefore, not appreciably attenuated.

In the case of the high explosive source, however, all pulses (15–17) are about of equal band width. Accordingly, they are all about equally attenuated, as shown.

It can be seen from comparison of the seismic amplitude signatures of the FIGS. 1A–B, 2A–B that a much more effective damper is required for the air valve source than for the high explosive source. It has been found that a sufficiently effective damper can be obtained by drastically reducing the hole fraction as described herein in accordance with the invention. Although it would appear at first sight that such a reduction would also seriously affect the amplitude of the seismic signal, it is found that the reduction which occurs is acceptable, whereby a relatively efficient and practical air valve source is obtained utilizing the specific combination set forth in the invention.

Thus the invention provides the precise, and heretofore unknown, combination of an air gun and a perforated damping shell. As noted above, to provide a practical and therefore usable marine air valve source, the degree of perforations and the size of the damping shell relative to the air valve energy output is rather critical. Explosions such as generated by dynamite or gas generate sufficient energy whereby the damping shell may have a ratio of perforations to total area equal to 30% or greater and still have a practical operating device. However as discussed above, the principles applied when using explosions no longer apply when the source of energy is an air valve or gun due to the characteristics of the generated pulses.

Accordingly, in keeping with the above discussion regarding the particular characteristics of the pulses generated by an air source, and the resulting demands placed on the design of a perforated shell in order to provide a damped air valve source of efficient operation, it is found that the percentage of area removed from the total surface of the shell by the perforations should be of the order of 25% or less. A suitable range of percentages is from 25 to 11%. The size, e.g., diameter, of the shell should be equal to, or larger than, the maximum diameter of the generated bubble, since no suppression occurs once the bubble expands to a diameter larger than the diameter of the shell. Accordingly, the present invention provides an air valve seismic source, including an effective damping shell consisting of a metal enclosure of selected volume, number of perforations, and shape, so as to suppress the contractions of the bubble formed by the air valve.

In addition, the amount of surface material removed from the shell, i.e., the number and pattern of the perforations, is also regulated in part by the type of surveying to be performed. For example, if high resolution exploration is desired, a broad signal spectrum is required, which is provided by a relatively high degree of damping. That is, if the secondary oscillations are allowed to occur unsuppressed, a narrow frequency spectrum is generated, which in this case is undesirable. Thus the perforations are made of small size, of fewer number, and/or the shell is made smaller in diameter to provide increased suppression of the secondary oscillations and a relatively wider signal spectrum. In this case, the percentage of shell surface required to be removed might approach, for example, a lower percentage of the order of less than 15%.

On the other hand, if a relatively narrow signal spectrum is required a modified degree of damping is desired. To this end, the perforations are made larger or of greater number, and/or the shell may be made larger in diameter. In this case, the percentage of shell surface removed may be of the order of 25%. It is to be understood that the shell diameter is preferably at least as large as the maximum bubble diameter.

With reference to FIGS. 3 and 4, there is shown an improved underwater seismic source formed generally of an enclosed damper means 12 in which is suspended, by means of supporting bracket means 14, a fast-acting high-pressure air valve 16. The invention utilizes the damper means 12 to suppress secondary pulses due to the generation of an air bubble within the water, wherein the damper means is spaced around the air valve means 16 a selected distance, as hereinbefore discussed. Proper choice of the size and porosity of the damper means 12 provides excellent damping without seriously degrading normal performance of the seismic source. Damping of the usual secondary oscillations is caused by the pressure difference generated when the water flows through the perforations in the damper means 12 as hereinbefore described.

More particularly, regarding the damper means 12, there is provided a generally cylindrical member 18, at one end of which is integrally secured a truncated cone member 20. The smaller end of the truncated cone member 20 is provided with a solid end plate 22 which is welded or otherwise secured thereto. A dome 24 is bolted or otherwise secured to the opposite end of the cylindrical member 18 wherein the cylindrical member 18, cone member 20, end plate 22, and dome 24 define a perforated shell which comprises, in effect, the damper means 12. All the various components which make up the shell with the exception of end plate 22 are provided with a multiplicity of perforations 26 to define thus a "sieve" which completely encloses the air valve means 16. The perforations 26 may be arranged in any selected order or pattern and are spaced apart to provide a ratio of perforations to total shell surface area which is preferably less than 25%. However, as previously noted the amount of surface area removed may vary from the order of 11 to 25% depending upon the amount of damping desired. By way of example only, the perforations 26 may be two inches in diameter, and suitably spaced to remove 11–25% of the shell surface. Towing eyes 27 are integrally secured to the dome 24 at selected positions to provide means for fastening a towing cable 29 to the source. As may be seen the rounded dome 24, the elongated cylindrical member 18 and the tapered cone member 20, provides a configuration which is readily towed underwater.

Regarding now the supporting bracket means 14 of previous mention there is provided a mounting plate 28 which is generally circular in shape which is secured as by welding to the dome 24. A plurality of bars 30 are welded at one of their ends to base plates 32 which in turn are shock-mounted to the mounting plate 28 by a respective number of shock mounts 34, such as for example, the lattice mountings which are manufactured by Lord Manufacturing Co., Erie, Pa. The other end of the bars 30 are rigidly secured to a valve plate 36.

The air valve 16 of previous mention is securely bolted or welded to the plate 36 and extends generally coaxially within the damper means 12. Compressed air is supplied from the surface of the water to the air valve 16 via an air hose 38, and the air valve is energized via an electrical line 40. The air hose 38 and electrical line are preferably secured to the towing cable 29.

Although the invention has been described herein with respect to generally a single embodiment, it is to be understood that various modifications could be made thereto within the spirit of the invention. Thus the shell may have a shape other than cylindrical-conical, e.g., it may be spherical, rectangular, oval, etc.

What is claimed is:

1. An underwater air seismic source for imparting an optimum seismic pulse to a surrounding medium utilizing a rapidly expanding air bubble while suppressing secondary oscillations caused by the contractions of the air bubble, comprising the combination of;

air valve means for introducing a burst of air to the surrounding medium;

damper means including a closed shell having a multiplicity of perforations formed therein disposed about said air valve means to impede the outward flow of the medium immediately surrounding the source, wherein said shell has a diameter at least equal to the maximum diameter of the air bubble, and wherein the total area of said perforations is less than one-fourth the total surface area of the surrounding shell; and fixed shock-mounting means secured within said damper means, said air valve means being rigidly secured thereto at a selected position within said damper means.

2. The source of claim 1 wherein the total area removed is less than 15% of the total surface area of the surrounding shell.

3. A method utilizing a burst of air for imparting an optimum seismic pulse of selected frequency range to a surrounding water medium while suppressing secondary oscillations, comprising the steps of;

supporting an air valve beneath the surface of the medium;

introducing air under pressure from the surface of the medium to the air valve;

selectively releasing the burst of air into said surrounding medium at a selected distance below the surface thereof to generate a rapidly expanding bubble of air;

encompassing the bubble of air in its initial phase within a perforated shell having of the order of 11% to 25% perforations in its total surface area to restrict the radially outward flow of water caused by the rapidly expanding bubble of air and to further restrict the radially inward flow of water caused by contraction of the bubble of air after expansion, the degree of restriction being adapted to suppress the secondary pulses of band widths approximately equal to the seismic band while reducing the seismic amplitude of the initial pulse of a band width relatively greater than the seismic pass band, the degree of restriction further being generally proportional to the selected frequency range; and maintaining the maximum diameter of the expanding bubble of air within the diameter of the perforated shell.

References Cited

UNITED STATES PATENTS

| | | | |
|---|---|---|---|
| 2,877,859 | 3/1959 | Knudsen | 181—0.5 |
| 3,249,177 | 5/1966 | Chelminski | 181—0.5 |
| 3,310,128 | 3/1967 | Chelminski | 181—0.5 |

RODNEY D. BENNETT, JR., Primary Examiner

D. C. KAUFMAN, Assistant Examiner

U.S. Cl. X.R.

340—7